INVENTOR
John H. Moreland.

J. H. MORELAND.
ANTIFRICTION BEARING.
APPLICATION FILED APR. 25, 1911.

1,211,956.

Patented Jan. 9, 1917.
6 SHEETS—SHEET 6.

WITNESSES
F. J. Hartman.
Clifton C. Hallowell.

INVENTOR
John H. Moreland
BY
ATTORNEY

UNITED STATES PATENT OFFICE.

JOHN H. MORELAND, OF ALTOONA, PENNSYLVANIA.

ANTIFRICTION-BEARING.

1,211,956.  Specification of Letters Patent.  Patented Jan. 9, 1917.

Application filed April 25, 1911. Serial No. 623,218.

*To all whom it may concern:*

Be it known that I, JOHN H. MORELAND, a citizen of the United States, and a resident of Altoona, in the county of Blair and State of Pennsylvania, have invented certain new and useful Improvements in Antifriction-Bearings, whereof the following is a specification, reference being had to the accompanying drawings.

This invention particularly relates to antifriction bearings of a class technically known as roller or ball bearings, and is especially adapted for use in connection with car wheel journals.

The principal object of this invention is to provide a simple and efficient anti-friction bearing in which the parts are held together to form a unitary structure which may be readily adjusted to and removed from a shaft or journal, as such.

Other objects of this invention are, to provide complementary bearing members respectively having ball races which are adjustable transversely with respect to the axis of the bearing; to provide a mounting for the bearing members arranged to permit a relative rocking movement between the bearing and its support; to provide seats for said bearing disposed in a position to prevent twisting of the bearing; to provide bearing members which are automatically adjusted to take up the wear; to provide means to limit the relative movement of said members; to provide bearing members having ball races whose wearing surfaces are greater at the region of greatest wear; to provide bearing members with races for bearing balls, constructed to carry the weight disposed transversely with respect to the axis of the journal, and to carry the end thrust in a direction parallel with said axis without effecting a greater pressure upon the balls than the weight carried; to provide bearing members with apertures extending into communication with the ball races therein, and arranged to convey oil by capillary attraction, to said races, and to convey grit or dirt therefrom; to provide an oil receptacle disposed in such relation to said apertures as to readily permit oil to flow therein; to provide a mounting for the bearing members having means to maintain in alinement the ball races of the respective bearing members; to provide adjustable means to retain said bearing members in operative relation; to provide means to prevent the accidental displacement of said adjustable means; to provide dust-guards operative to protect the bearing members; to provide a casing for the bearing; to provide a dust-guard for said casing having a packing pocket surrounding the shaft in said bearing; and to provide a closure for the open end of said casing, hingedly secured thereto and disposed in vertical position when closed, and maintained in closed position by snapping its edge over the edge of said casing.

The form of this invention hereinafter described is particularly adapted to be applied to a car wheel journal, and includes a bearing formed as hereinafter described, having a sleeve snugly fitted to said journal and secured thereto by slipping the bearing over said journal and binding said sleeve thereto by nuts engaged with threads on the free end of said journal.

Further objects of this invention are, to provide dust-guards having a frame relatively fixed with respect to the relatively stationary bearing members, and having a movable plate surrounding the shaft or journal and movable in accordance with any displacement of the axis thereof; to provide said dust-guards with separate split plates disposed upon opposite sides of said shaft, each having a semi-circular recess embracing said shaft, and provided with undercut ball races whose overhanging edges prevent displacement of said balls when removed from said shaft.

This invention also includes all of the various novel features of construction and arrangement hereinafter more definitely specified.

In the accompanying drawings.

In said figures the axle 1 has the journal 2, upon which the bearing sleeve 3 is secured by the nut 4, bearing upon the collar 5, which is fitted in a shoulder 6 in said sleeve 3. Said nut 4 is in threaded engagement with the threads 7 on the reduced end of said journal 2 and is prevented from accidental displacement by the nut-lock 8, which is held engaged therewith by the jam-nut 9 on the threads 10.

The sleeve 3 is provided with the spaced ball races 11 for the bearing balls 12, and is provided with flanges 13 at its opposite ends, having opposed curved shoulders 14, to provide races for the thrust balls 15. Said sleeve 3 is embraced by the semi-cylindrical bearing member 16, having ball races 17 complementary to the ball races 11 in the sleeve 3, and having flanges 18 whose outer edges overhang the flanges 13 on the sleeve 3 and have curved shoulders therein opposed to the curved shoulders 14 in the sleeve 3, and arranged to form ball races for the thrust bearing balls 15.

The flanges 18 of the bearing member 16 are fitted into suitable recesses 20 in the mounting or saddle 21, and said bearing member 16 is also provided with the laterally extending flanges 23 substantially in a plane with the axis of the journal 2, and having projecting ribs 25 fitted into the vertically disposed channels 26 in the mounting 21, said flanges 23 serving to prevent rotation of the bearing member 16 by engagement with the shoulder 27 in said mounting, and said ribs 25 and flanges 18 serving to prevent longitudinal displacement of said bearing member 16. This bearing member 16 varies in width throughout its transverse section; that is to say, it is thinnest at its sides and thickest at the top; in other words, the outside cylindrical surface of the said bearing member is slightly concentric with respect to the center of the inner bearing surface so as to make it constantly increasing in thickness from the sides to the top, and thickest at its crest or top as clearly illustrated in Fig. 3. This top bearing member 16 is the part which substantially supports the load and the tendency of the ball bearings interposed between the bearing member 16 and the sleeve 3 is to wear the bearing member greatest at the top and to impose a constantly decreasing wear upon the same down to the sides. By making then this bearing member 16 thicker at its crest, the same may be allowed to wear considerably; that is to say, until the channels forming the ball race approach a curve concentric with the outer surface of the member 16 and when so worn, the bearing member 16 will be as thick at the top as it will be at the sides.

The lower half of the sleeve 3 is embraced by the bearing members 30 and 31, whose ball races 32 are complementary to the ball races 11; the bearing members 31 each being further provided with a curved shoulder 33 in opposition to the respective curved shoulders 14 in the sleeve 3, and forming a race for the thrust balls 15. Each of the bearing members 30 has two ball races 32 therein, which are provided with a central groove 34, in communication with an elongated aperture 35 at the bottom thereof and which extends downwardly through said bearing members for the escape of dirt and grit from said ball races, and for the escape of any of the broken or crushed balls therein. Said apertures 35 and grooves 34 also provide suitable passageways for the conveyance of oil to the ball races, and by reason of the reduced bearing surface in the races 32, the wear therein will be substantially equal to the wear in the region of greater pressure.

As best shown in Figs. 9, 10, 12 and 13, the bearing members 30 and 31 have lateral ribs 37 and 38 respectively, which are fitted in the channels 26 in the mounting 21 to maintain said bearing members in a position with respect to the semi-cylindrical bearing member 16, to register the ball races 32 with the ball races 17.

Figure 12:
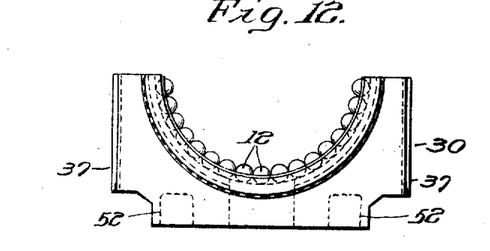
Fig. 12 is a side elevation of one of the intermediate lower bearing members.
Figure 13:
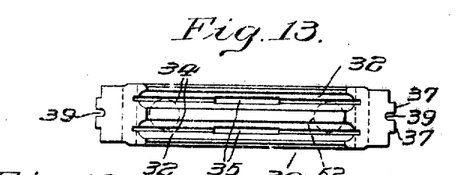
Fig. 13 is a plan view of the bearing member shown in Fig. 12.
Figure 14:
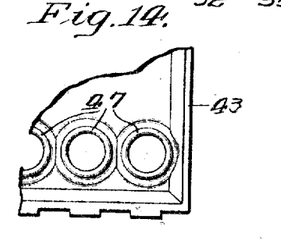
Fig. 14 is a fragmentary plan view showing one corner of the oil receptacle.

As best shown in Figs. 12 and 13, the lateral ribs 37 of the bearing members 30 are provided with grooves 39 for the escape of oil from the ball races, which affords a free circulation of oil upwardly through the apertures 35 and back through the grooves 39 to the oil receptacle 42. The oil receptacle 42 has a rim 43 extending above the lower portions of the bearing members 30 and 31, and provides a receptacle for oily waste 45.

Figure 1:
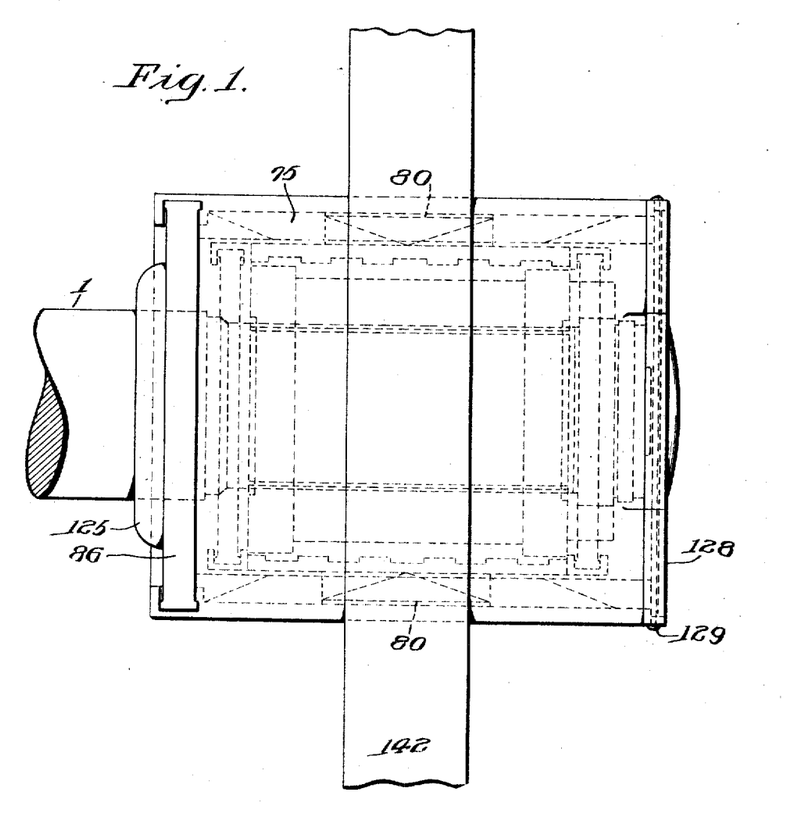
Figure 1 is a plan view of a bearing constructed in accordance with this invention, mounted on a journal within its casing.
Figure 2:
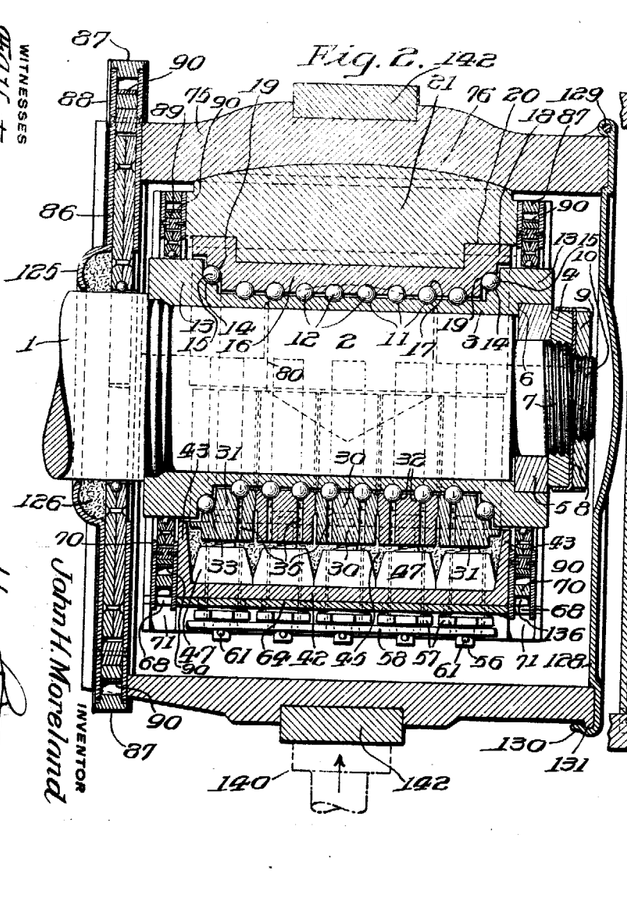
Fig. 2 is a longitudinal sectional view of the bearing shown in Fig. 1, taken along the axis of said journal, the journal being shown in elevation for convenience of illustration.
Figure 3:
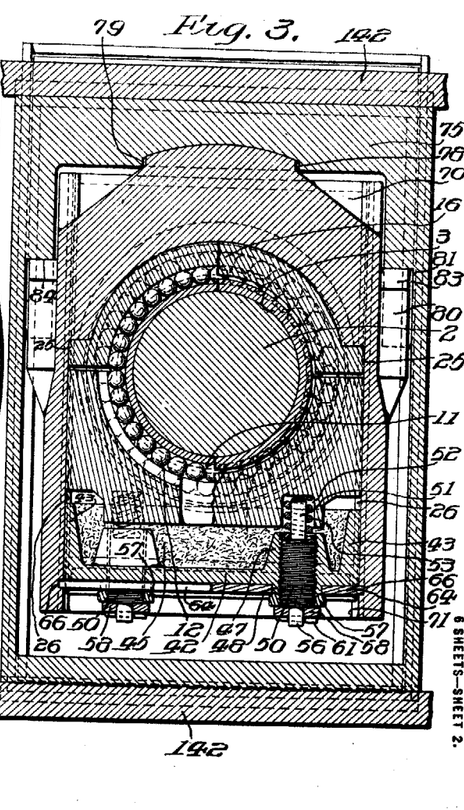
Fig. 3 is a transverse vertical staggered sectional view on different planes in Fig. 1.
Figures 5, 6:
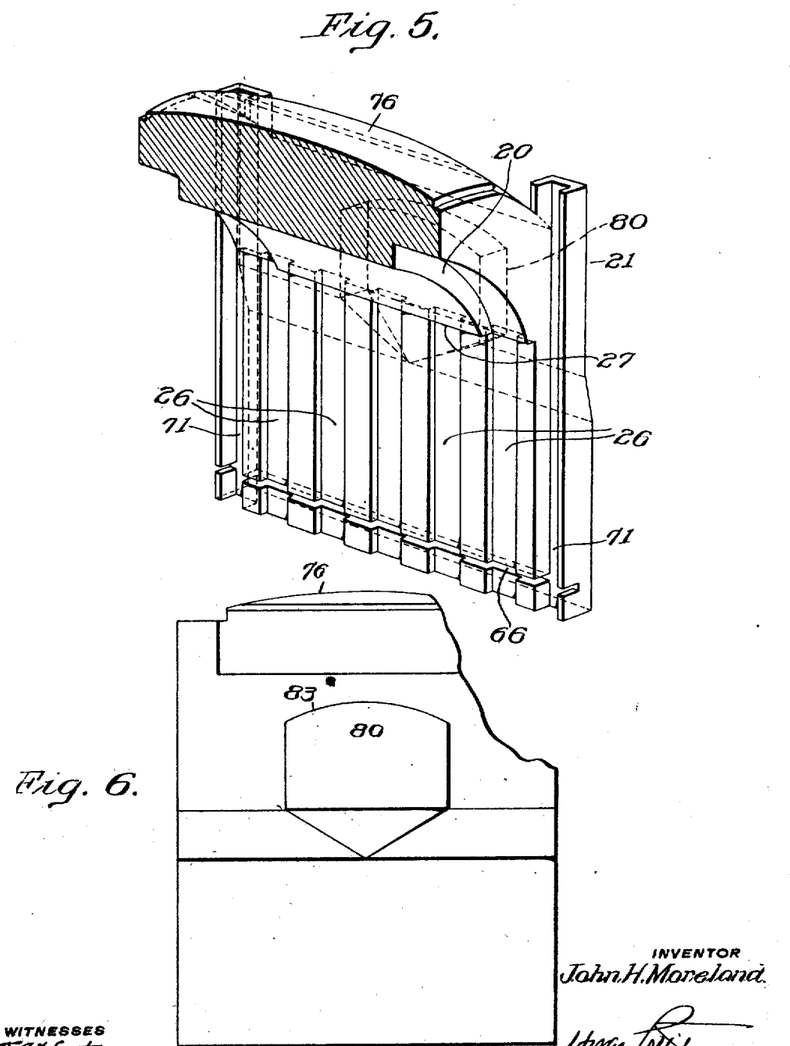
Fig. 5 is a central longitudinal sectional perspective view of the bearing mounting or saddle.
Fig. 6 is a fragmentary side elevational view of said mounting or saddle.
Figure 7:
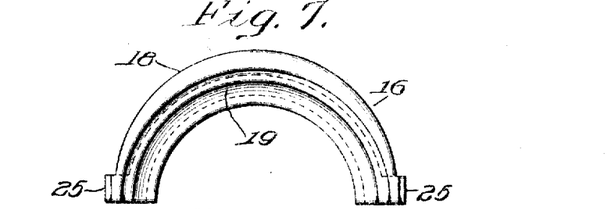
Fig. 7 is an end view of the semi-cylindrical upper bearing member.
Figure 8:
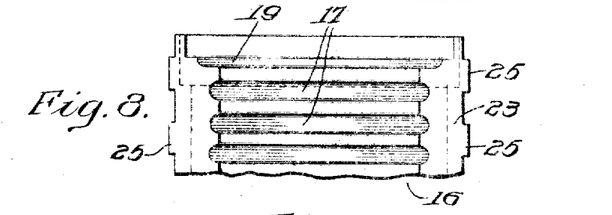
Fig. 8 is a fragmentary inverted plan view of the bearing member shown in Fig. 7.
Figure 9:
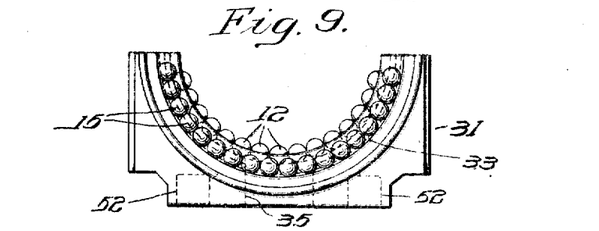
Fig. 9 is a side elevation of one of the end lower bearing members.
Figure 10:
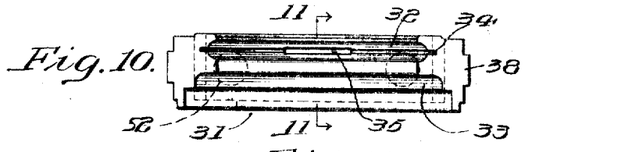
Fig. 10 is a plan view of the bearing member shown in Fig. 9.
Figure 11:
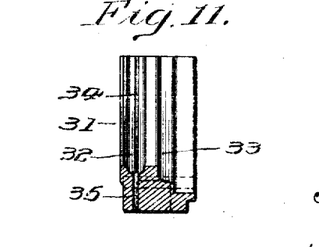
Fig. 11 is a central vertical transverse sectional view taken on the line 11—11 in Fig. 10.
Figure 17:
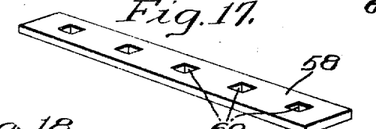
Fig. 17 is a locking plate arranged to prevent accidental rotation of the adjusting screws.
Figure 18:
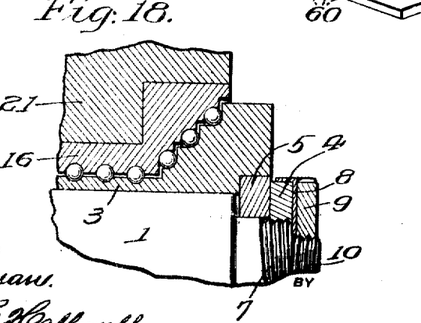
Fig. 18 is a fragmentary central sectional view showing the bearing members having a plurality of thrust ball races disposed in different circular extent.

Said oil receptacle 42 is provided with hollow threaded internal and external alined bosses 47 and 48 respectively, in which the adjustable screws 50 are fitted. Each of the screws 50 has a reduced extension 51 projecting into an alined socket 52. The respective sockets are disposed in the lower face of the bearing members 30 and 31, centrally between the ball races, said extension projecting into close proximity to the inner wall of said socket and being surrounded by a coiled spring 53, which is seated in a groove or depression 55 in the top of the screw 50, and which serves to normally retain the bearing members 30 and 31 in their operative position against the balls in the races 32. The adjusting screws 50 are each provided with a squared extension 56, and are provided with lock-nuts 57 and prevented from rotation by lock-plates 58, which, as best shown in Fig. 17, are provided with a plurality of square apertures 60 adapted to fit over the squared extensions 56 of the alined adjusting screws 50, as best shown in Fig. 2. As shown in Figs. 2 and 3, said lock-plates are retained upon the squared extensions 56 by suitable pins or cotters 61, which are driven through apertures 62 near the outer extremity of said squared extensions 56. The oil receptacle 42 and the parts upheld thereby are supported by the supporting plate 64, which, as best shown in Fig. 15, is provided with apertures 65 for the reception of the exterior bosses 48, which when thus engaged prevents the displacement of said supporting plate 64, which is supported at its edges in a channel or groove 66, as best shown in Figs. 3 and 5.

Figure 15:
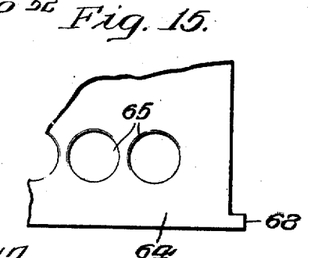
Fig. 15 is a fragmentary plan view showing one corner of the supporting plate arranged to retain the oil receptacle and bearing members in operative position in the mounting.
Figure 16:
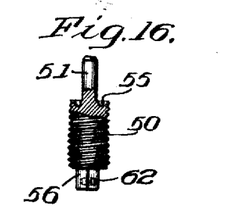
Fig. 16 is a sectional elevational view of one of the adjusting screws for retaining the bearing members in operative position.

As best shown in Figs. 2 and 15, the supporting plate 64 is provided with lugs or extensions 68, whose outer edges terminate coincident with the end surfaces of the mounting or saddle 21 and are arranged to support the dust-guards 70, which are mounted in channels 71 at the end of the mounting or saddle 21, and which will be hereinafter described in detail.

Figure 4:
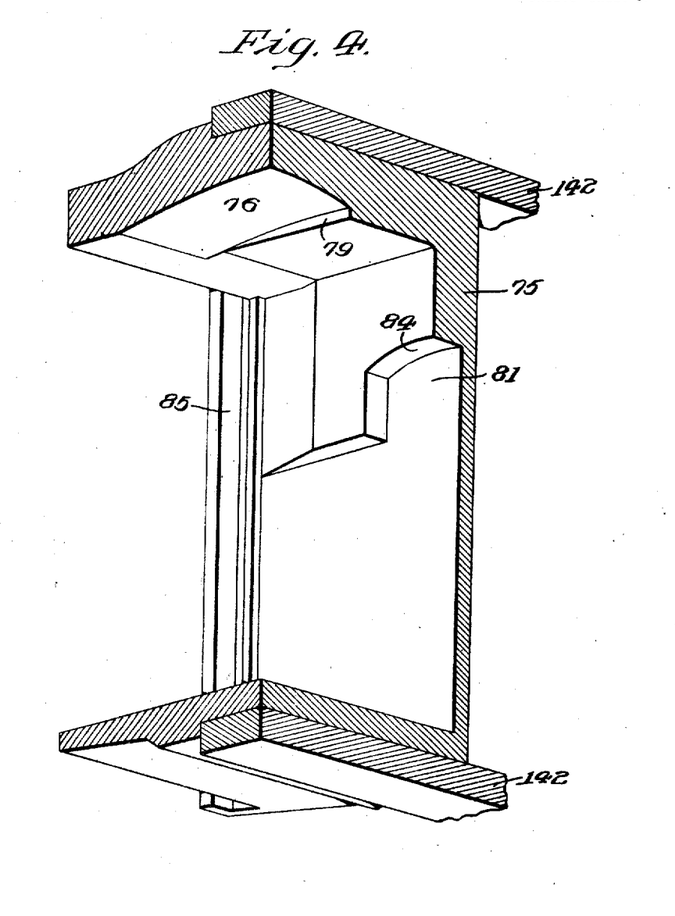
Fig. 4 is a fragmentary perspective view, looking into the upper corner of the bearing casing.

The structure thus far described comprises the bearing proper, which may be secured to the journal 2 and removed therefrom as a unitary structure, and when adjusted on the journal 2, as best shown in Fig. 2, is inclosed in the casing 75, which has a concave upper wall fitted to the convex supporting surface 76 of the mounting 21, so as to afford a free rocking movement of the journal 2 in a vertical plane. Said convex surface terminates laterally in parallel shoulders 78, which are in parallel relation with the axis of said journal, and which are disposed loosely between the parallel shoulders 79 in the casing 75, as best shown in Figs. 3 and 4, so as to permit a slight lateral movement of the bearing with respect to its casing. In order to prevent a twisting movement of the bearing in said casing, the mounting 21 is provided with laterally disposed side lugs or saddles 80 projecting into the recess 81 in the casing 75, as best shown in Figs. 3 and 4, and having a curved upper surface 83, upon which the seat 84 of said casing rests, thus giving the supporting casing 75 three points of support upon the bearing mounting 21, which has a slight sliding movement in the casing 75 laterally, and is free to rock or slide in a plane parallel with the axis of the journal 2, whereby a dropping of the axle 1, incident to the inequalities of the roadbed, may be accommodated without injury to the bearing members, and whereby the wheel is free to vibrate laterally. The casing 75 is provided with opposed channels 85, as best shown in Fig. 4, for the dust-guard 86, which closes the inner end of the casing 75 and which embraces the axle 1, and is so constructed as to permit said axle to move eccentrically with respect to its normal axis, without buckling or otherwise straining said dust-guard 86.

The opening in the outer end of the casing 75 is provided with a closure 128, formed preferably of a sheet metal stamping and hingedly secured by the pintle 129 to the top upper edge of said casing 75, and provided with a spring edge 130 at its bottom edge for engagement with the beading 131 extended along the lower out edge of said casing 75, whereby said closure 128 may be snapped into and out of engagement with said beading 131 to lock or unlock said closure 128, as desired. It may be here noted that by reason of the vertical position of the closure 128, the continuous vertical jar of the journal, incident to the inequalities of the roadbed being traversed by the wheels of said journal, will not be effective to accidentally open said closure, as is the case where a closure is disposed in a plane oblique to the axis of the journal. The dust-guards 70, which are disposed at the opposite ends of the anti-friction bearing, are similar to the dust-guard 86 above described, with the exception of the outer frame 135, which, as best shown in Fig. 22, is provided with depending feet 136, which are supported by the lugs or extensions 68 of the supporting plate 64, as best shown in Fig. 2, and said frame 135 has only its vertical bars flanged, which permits the outer plates to extend flush with its upper edge and to extend below its lower edge, as best shown in Fig. 2; furthermore, the dust-guards 70 do not include a packing pocket, as does the dust-guard 86.

Referring to Fig. 2, it will be readily seen that by placing a jack 140, as shown in dot and dash lines in said figure, beneath the truck frame 142 and raising the casing 75 sufficiently to clear the surface 76, the antifriction bearing may be disengaged from the journal 2 by removing the nuts 4 and 9 and sliding said bearing therefrom, so that a defective bearing may be readily removed and replaced by a perfect bearing without withdrawing the car from service. It may be observed that bearings constructed in accordance with this invention may be assembled at the shops and shipped to various points along the line for use in case of emergency. The assembling of the bearing is conveniently effected by inverting the mounting 21 and inserting the bearing member 16 in the pocket provided therefor, the balls 12 being then laid in their respective races, forming a half series, whereupon the sleeve 3, having the dust-guards 70 slipped over the flanges 13 at its opposite ends, is laid upon said bearing balls by sliding the dust-guards 70 into their respective channels 71. The balls 15 are then dropped into their respective races formed between the curved shoulders 14 and 19. The remaining balls are then laid in the ball races 11 and the bearing members 30 and 31 slid thereover with their respective lateral flanges 37 and 38 in engagement with the channels 26 in the mounting 21. Having thus built up the bearing, the oil receptacle 42 is then slipped into position with its lateral flanges in engagement with said channels 26, after which the supporting plate 64 is slid endwise in the channel 66 until its apertures register with the exterior bosses 48 on said oil receptacle 42, whereupon the springs 53 are dropped into the sockets 52 and the adjustable screws 50 are inserted in the threaded apertures in the bosses 47 and 48 and adjusted to effect the desired pressure upon the bearing members 30 and 31, whereupon the lock-nuts 57 are adjusted, the locking-plate 58 mounted on the squared extension 56, and the cotter pins 61 inserted to hold said locking-plate in engagement therewith. In assembling this bearing, it is to be observed that the adjacent edges of the bearing member 16 and the series of bearing members 30 and 31 are at first slightly spaced apart as clearly shown in Fig. 3. The purpose of this is to permit the members 30 and 31 to take up the wear as the balls deepen the channel in the top bearing member 16. This space between the adjacent edges of the top and bottom bearing members in no wise effects the action of the balls in the race-ways. Theoretically, the balls at and below the horizontal plane passing through the axis of the shaft 2 do not support the load, and, therefore, are not subject to great pressure between the bearing members 16, 30 and 31 and the inner sleeve 3. This space between the adjacent edges of the bearing members is, of course, not great as compared with the diameter of the balls and the separation of the adjacent edges shown in Fig. 3 is on an exaggerated scale for the sake of clearness in illustration.

Although the bearing chosen for illustration is particularly applicable to a car wheel journal, it is to be understood that it may be conveniently adapted to any rotatable mechanism, and therefore it is not desired to limit this invention to the precise details of construction and arrangement herein set forth, as it is obvious that various modifications may be made therein without departing from the essential features of the invention as defined in the appended claims.

Having thus described my invention, I claim:

1. In an anti-friction bearing, a casing, a journal, an upper bearing member between said casing and said journal, provided with a semicircular series of ball races, a lower bearing member comprising a series of alined members mounted in said casing below said journal each member having a semicircular ball race in registration with and completing a ball race in said upper member, said ball race in each of said alined members being independent of the races in others of said alined members, a series of anti-friction balls in each of said raceways, said upper and lower members being slightly spaced from each other in a plane coincident with the longitudinal axis of said journal and springs in said casing between said casing and said complemental members to force said members toward the axis of said journal.

2. In an anti-friction bearing, the combination of a casing, a journal, an upper bearing block above said journal, supporting said casing and provided with a plurality of ball races, a lower complemental bearing member comprising a series of independent alined spring pressed members each provided with a ball race completing a ball race in said upper bearing block, a series of balls in each of said races and springs for forcing said alined members toward the axis of said journal, said upper bearing block and said complemental bearing member being slightly separated along a horizontal plane passing through the axis of said journal whereby the load is substantially carried by the balls between said journal and said upper bearing block, the race-ways for said balls being completed by said lower alined members, and the wear on said balls and races being taken up by said spring pressed members of the lower complemental bearing member.

3. In an anti-friction bearing, the combination with a journal, of opposed complementary bearing members, the upper one of which bears substantially the load upon said journal and the lower one of which bears a much less load, said complementary bearing members being slightly separated on a longitudinal plane passing through the axis of said journal, said members being provided with ball races in registration with each other, and bearing balls in said races, the races in said lower bearing member which is subjected to the least load being grooved longitudinally to substantially equalize the wear to which said races are subjected and to form a circulatory path for a lubricant and yielding means to hold said lower member against said journal and to take up the wear in said races.

4. In an anti-friction bearing for a journal, the combination of complemental bearing members slightly separated on a longitudinal plane and provided with grooves forming a ball race, one of said bearing members being subjected to more load than the other of said bearing members, and bearing balls mounted in said races, the members subjected to the least wear being provided with channels in the bottoms of said grooves and extending longitudinally of said grooves and being provided with apertures extending through said bearing members and communicating with said channels, said channels and apertures being coöperative to form a circulatory path for a lubricant and to make the wear of the balls in the races of the member subjected to the least load substantially equal to the wear of the races in the member subjected to the greater load and spring means to force the member subjected to the least load against said journal.

5. In an anti-friction bearing, a journal, a semi-cylindrical upper bearing member gradually increasing in thickness in transverse cross-section circularly toward its crest and having a plurality of spaced ball races at a uniform distance from the axis of said bearing and a plurality of ball races at a relatively greater distance from said axis, a coöperating semicylindrical bearing on the lower side of said journal provided with coöperating ball races and anti-friction balls in said races and means to yieldingly press said lower bearing member against said journal.

6. In an anti-friction bearing, the combination of a journal, a semi-cylindrical upper bearing member gradually increasing in thickness in transverse cross-section circular toward its crest and having a plurality of ball races disposed at different distances from its axis, a semicylindrical lower bearing member provided with similarly disposed and registering ball races, anti-friction balls in said races and means to yieldingly hold said lower bearing member against said journal to preserve the continuity of said races and to take up wear in said races.

7. In a bearing for a journal box, the combination with a mounting having convex supporting surfaces fitted to said journal box and having a plurality of internally disposed grooves, a plurality of complementary bearing members respectively having lateral ribs slidably engaged in said grooves, a sleeve within said complementary members, and anti-friction means between said members and said sleeve, said bearing being removable from said journal box as a unitary structure.

8. In an anti-friction bearing, the combination of a casing, a journal, a substantially semi-cylindrical upper bearing member fitted within said casing and having a plurality of ball races and also provided with a flange extending outwardly along its lateral edges, outwardly around its semi-circular ends for engagement with said casing to prevent displacement thereof with respect to said casing, a substantially semi-cylindrical lower bearing member also mounted within said casing, antifriction means between said bearing members and said casing, said bearing members being slightly separated in a substantially horizontal plane passing through the axis of said journal, and yielding means interposed between the bottom of said casing and the lower bearing member to hold said lower bearing member against said journal to maintain the continuity of the races and to take up the wear of said races.

9. In a bearing for a journal box, the combination with a mounting having a convex supporting surface and means projecting therefrom having curved supporting surfaces for engagement with said journal box, and having a plurality of internally disposed channels, a semi-cylindrical bearing member having a flange engaging said channels and a plurality of opposed bearing members having ribs slidably engaged in said channels, a sleeve within said bearing members, anti-friction means between said bearing members and said sleeve, and means connected with said mounting tending to force said bearing members together, said bearing being removable from said journal box as a unitary structure.

10. In a bearing for a journal box, the combination with a mounting having a curved supporting surface for engagement with said journal box and having laterally projecting lugs having curved supporting surfaces for engaging said journal box, and having internally disposed channels extending transverse to the axis of said bearing and channels extending parallel to the axis of said bearing, relatively movable bearing members having means slidably engaged in said channels, means tending to yieldingly force said bearing members together, a sleeve within said bearing members, anti-friction means between said sleeve and said bearing members, and a supporting plate having its lateral edge engaged in said parallel channels for holding the structure together, said bearing being removable from the journal and box as a unitary structure.

11. In an anti-friction bearing, the combination with a sleeve having a plurality of ball races, concentric with the axis of said bearing, of bearing balls in said races, and opposed bearing members separated on a horizontal plane coincident with the axis of said bearing, both members being provided with races in registry with the races in said sleeve, a portion of the circular extent of said races in the lower bearing members being grooved centrally longitudinally, while the balance of said races conforms to the shape of said balls to equalize the wear on the races of the said bearing members.

12. In an anti-friction bearing, the combination with a sleeve having a plurality of ball races concentric with the axis of said bearing, of bearing balls in said races, and opposed bearing members embracing said sleeve, separable substantially on a plane parallel with the axis of said bearing, one of said members being subjected to a greater load than the other of said members and being provided with and comprising ball races in registry with the ball races of said sleeve, the upper half of said races in the bearing members subjected to the lesser load conforming to the path of the balls, and the lower half of said races being provided with longitudinal grooves terminating in an open slot extending through said member.

13. In an anti-friction bearing, the combination with a sleeve, of bearing members embracing said sleeve and separable substantially on a horizontal plane coincident with the axis of said bearing, and respectively comprising registered ball races, balls in said races, a mounting for said bearing members, and means in said mounting arranged to retain said bearing members in operative position, the lowermost races being grooved to equalize the wear on said races, to receive the grit from said races and to convey oil thereto, while the uppermost portion conforms to the contour of the path of the balls.

14. In an anti-friction bearing, the combination with a sleeve, of respectively movable bearing members separable on a longitudinal plane and respectively comprising ball races in registry, and balls in said races, the lower bearing member being formed of a plurality of relatively movable race units, each being independently retained in operative position, and means arranged to retain said units in said operative position.

15. In an anti-friction bearing, the combination with a sleeve, of a substantially semi-cylindrical bearing member embracing substantially one-half of said sleeve, and provided with a plurality of ball races, a plurality of bearing members complementary to said semi-cylindrical bearing member and provided with ball races in registry with the races in said semi-cylindrical member, bearing balls in said races, and separate means arranged to yieldingly retain said bearing members in operative position.

16. In an anti-friction bearing, the combination with a sleeve, of a plurality of bearing members disposed side by side and embracing approximately one-half of said sleeve, each bearing member having a restricted aperture extending through its wall in communication with the ball races therein and elongated in the direction of said race, an undivided bearing member complementary to the first mentioned bearing members and embracing the other half of said sleeve, said undivided member having ball races in registration with the races in said first mentioned bearing members and embracing substantially the other half of said sleeve and balls in said races between said bearing members and said sleeve.

17. In an anti-friction bearing, the combination with a sleeve, of a substantially semi-cylindrical bearing member comprising a plurality of ball races, rolling members in said races, and a series of separate bearing members complementary to said semi-cylindrical bearing member, having ball races arranged to register with the races in said semi-cylindrical bearing member and provided with lateral projections adjacent to said races and arranged to maintain said bearing members spaced.

18. In an anti-friction bearing, the combination with a sleeve, of bearing balls, a bearing member partially embracing substantially one half of said sleeve and arranged to support the weight, and having races which conform to the curvature of the balls therein, and a complementary bearing member having races arranged to register with the races in said first mentioned bearing member and in said sleeve, the races in the last mentioned bearing member being grooved to afford less surface with which the balls engage than the bearing surface in the races of said first mentioned bearing member.

19. In an anti-friction bearing, the combination with a sleeve, of bearing balls, complementary bearing members separable on a longitudinal plane, the member carrying the greatest weight being thickened at the region of thrust, and comprising ball races which conform to the balls therein, and the opposed bearing members having ball races which are provided with grooves in communication with apertures through said bearing members, said grooves and apertures being arranged to discharge grit from said races and to convey oil thereto.

20. In an anti-friction bearing, the combination with a sleeve, of rolling members, complementary bearing members separable on a longitudinal plane, each comprising ball races, the member carrying the greatest load being thickened in the region of greatest thrust, and having its ball races conforming to the curvature of the balls therein, and the races in the opposed bearing having grooves therein and providing less bearing surface for said balls, to afford uniform wearing of the races throughout their extent, and means to yieldingly retain said bearing members in operative position.

21. In an anti-friction bearing, the combination with an inner bearing member, of complementary outer bearing members separable on a longitudinal plane, one of said bearing members being undivided and extending substantially the full length of the bearing and arranged to support the load, and the other of said bearing members being divided into a plurality of alined bearing members, ball bearings between said inner and outer bearing members, means to support said alined bearing members in operative position and having projections, and a locking plate common to said members and arranged to lock said supporting means in any adjusted position.

22. In an anti-friction bearing, the combination with an inner bearing member, of complementary outer bearing members embracing said inner bearing member and separable on a longitudinal plane, anti-friction bearing members between said inner and outer bearing members, a mounting for said bearing members, adjustable studs arranged to retain said bearing members in operative position and comprising polygonal projections, and a locking-plate arranged to engage said projections to prevent accidental displacement of said adjustable studs.

23. In an anti-friction bearing, the combination with an inner bearing member, of a plurality of alined outer bearing members, each having a pair of spaced ball races, bearing balls in said races, independent adjustable yielding means engaging each of said outer bearing members intermediate of the adjacent ball races thereof, to force said bearing members into operative engagement with said balls and means to lock said adjustable means in any adjusted position.

24. In an anti-friction bearing, the combination with an inner bearing member, of a plurality of alined outer bearing members, each provided with spaced ball races and having lateral bosses adjacent to said races providing engaging surfaces for adjacent outer bearing members, bearing balls in said races, adjustable yielding means engaging said outer bearing members operative to force said bearing balls into engagement with said inner bearing member and means to lock said yielding means in any adjusted position.

25. In an anti-friction bearing, the combination with opposed bearing members, separable on a plane parallel with the axis of said bearing, one of said members being arranged to support the major portion of the load, both members being provided with ball races, of bearing balls in said races, a portion of the circular extent of said races of said bearing member arranged to support the lesser load being grooved centrally, while the balance of said race conforms to the shape of the balls to equalize the wear on the races of said members.

26. In an anti-friction bearing, the combination with a sleeve arranged to fit a shaft or journal, of means to securely engage said sleeve to said shaft in removable relation, bearing members embracing said sleeve, said bearing members being separable transverse to the axis of said bearing, and having ball races, means yieldingly retaining said bearing members in operative position, a mounting for said bearing members, bearing balls in said races, and means including a slide plate operative to hold said mounting and members together as a unitary structure which is removable from said shaft as such, being prevented from displacement by said retaining means.

27. In an anti-friction bearing, the combination with a mounting having recesses and depending walls provided with channels in their inner surfaces, a semi-cylindrical bearing member fitted in said mounting, provided with spaced ball races and having flanges extending into said recesses and firmly engaging said bearing member with said mounting, a journal sleeve having ball races in registry with the races in said bearing member, independently adjustable bearing members provided with lateral ribs slidably engaged in said channels and having ball races in alinement with the ball races in said cylindrical bearing member, bearing balls in said races, and means engageable with said depending walls, holding all of the parts together to form a unitary structure which is readily engageable with and removable from the journal as a whole.

28. In an anti-friction bearing, the combination with a mounting provided with recesses and depending lateral extensions provided with channels in their inner surfaces, of a semi-cylindrical bearing member fitted in said mounting, provided with spaced ball races and having flanges extending into said recesses and firmly engaging said bearing member with said mounting, a journal member having ball races in registry with the races in said bearing member, a plurality of alined adjustable bearing members provided with lateral ribs slidably engaged in said channels and having ball races in alinement with the ball races in said semi-cylindrical bearing member, balls in said races, a member having threaded bosses, adjusting screws in threaded engagement with said bosses operative to independently adjust the respective complementary bearing members, and means engageable with said depending extensions supporting the member having said threaded bosses, and maintaining all of the parts intact.

29. In an anti-friction bearing, the combination with a mounting provided with recesses and depending lateral extensions provided with channels in their inner surfaces, a semi-cylindrical bearing member fitted to said mounting, provided with races, and having flanges extending into said recesses firmly engaging said bearing member with said mounting, a journal sleeve having races in registry with the races in said bearing member, a plurality of independent adjustable bearing members complementary to said cylindrical bearing member provided with lateral ribs slidably engaged in said channels and having races in alinement with the races in said semi-cylindrical bearing member, rotatable members mounted to traverse said races, and means arranged to independently adjust said complementary bearing member with respect to said semi-cylindrical bearing member.

30. In an anti-friction bearing, the combination with a mounting having an arched crown and depending walls provided with channels in their inner surfaces, a semi-cylindrical bearing member fitted in said mounting, provided with spaced ball races and having flanges provided with lugs extending into said channels firmly engaging said bearing member with said mounting, a journal sleeve having ball races in registry with the races in said bearing member, a series of longitudinally alined independently adjustable bearing members complementary to said cylindrical bearing member provided with lateral ribs slidably engaging said channels, and having ball races in alinement with the ball races in said semi-cylindrical bearing member, bearing balls in said races, and adjustable means tending to force said complementary bearing members toward said semi-cylindrical bearing member.

31. In an anti-friction bearing, the combination with a mounting having an arched crown and depending extensions provided with channels in their inner surfaces, an upper bearing member fitted in said mounting, provided with spaced ball races and having flanges provided with lugs extending into said races firmly engaging said bearing member with said mounting, a journal sleeve having ball races in registry with the races in said bearing member, a series of longitudinally alined independently adjustable members provided with lateral ribs slidably engaged in said channels and having ball races complementary to the ball races in said upper bearing member, bearing balls in said races, and adjustable means yieldingly tending to press said bearing members together.

32. In an anti-friction bearing, the combination with a mounting having an arched crown and depending lateral extensions each provided with parallel channels intersected by a transverse groove in their inner surfaces, an upper bearing member fitted in the arched crown of said mounting, and provided with spaced ball races and having flanges provided with lugs extending into said channels firmly engaging said bearing member with said mounting, a journal sleeve having ball races in registry with the races in said bearing members, a series of longitudinally alined independently adjustable bearing members provided with lateral ribs slidably engaged in said channels and having ball races in alinement with the ball races in said upper bearing member, bearing balls in said races, a member having threaded bosses, adjusting screws in threaded engagement with said bosses, resilient means disposed between said adjustable bearing members and said screws, a locking plate engaged with said grooves and having apertures engageable with said bosses to prevent its displacement, and means for locking said adjusting screws.

In witness whereof, I have hereunto set my hand this 24th day of April, A. D., 1911.

JOHN H. MORELAND.

Witnesses:
Mrs. FREDERICK CLOUGHLEY,
CLIFTON C. HALLOWELL,
ALEXANDER PARK.